United States Patent [19]

Dallman

[11] 4,279,236

[45] Jul. 21, 1981

[54] AUTOMOTIVE FUEL SAVING SYSTEM

[76] Inventor: Alfred C. Dallman, 2437 Bending Willow Dr., Kettering, Ohio 45440

[21] Appl. No.: 83,904

[22] Filed: Oct. 11, 1979

[51] Int. Cl.³ ............................................. F02M 25/06
[52] U.S. Cl. .................................... 123/573; 123/572; 123/585
[58] Field of Search ...................... 123/572, 573, 41.86, 123/585, 556

[56] References Cited

U.S. PATENT DOCUMENTS

| | | | |
|---|---|---|---|
| 3,358,661 | 12/1967 | Garner | 123/573 |
| 3,990,421 | 11/1976 | Grainger | 123/572 |
| 4,103,655 | 8/1978 | Coles | 123/572 |

*Primary Examiner*—Ronald H. Lazarus
*Attorney, Agent, or Firm*—Donald J. Singer; Robert Kern Duncan

[57] ABSTRACT

In a first air flow circuit filtered ram air cooperating with an aspirator draws crankcase vapors from the crankcase of an internal combustion engine. Heavy particulate matter in the crankcase vapor is heated and further vaporized by a heat exchanger cooperating with an exhaust manifold of the engine. A second aspirator draws the vaporized particulate matter back into the original vapor steam of the first air flow circuit. The crankcase vapors mixed with the incoming ram air are then directed into the interior cavity of the carburetor air filter. In a second air flow circuit filtered ram air is directed into the crankcase and carburetor air filter cavity and in a third air flow circuit filtered air is drawn through a variable annular orifice and metered in accord with intake manifold pressure and directed into the engine air intake system below the carburetor throttle plate.

8 Claims, 8 Drawing Figures

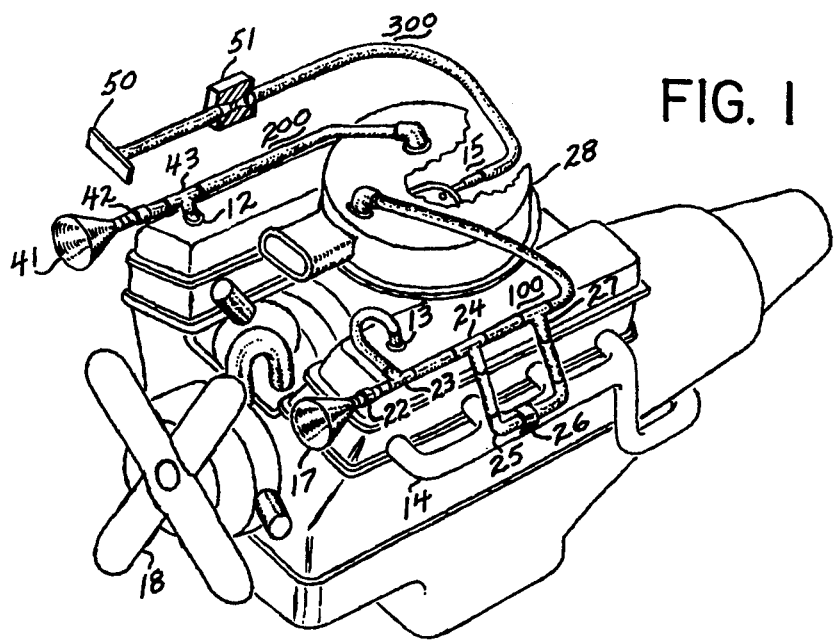
FIG. 1
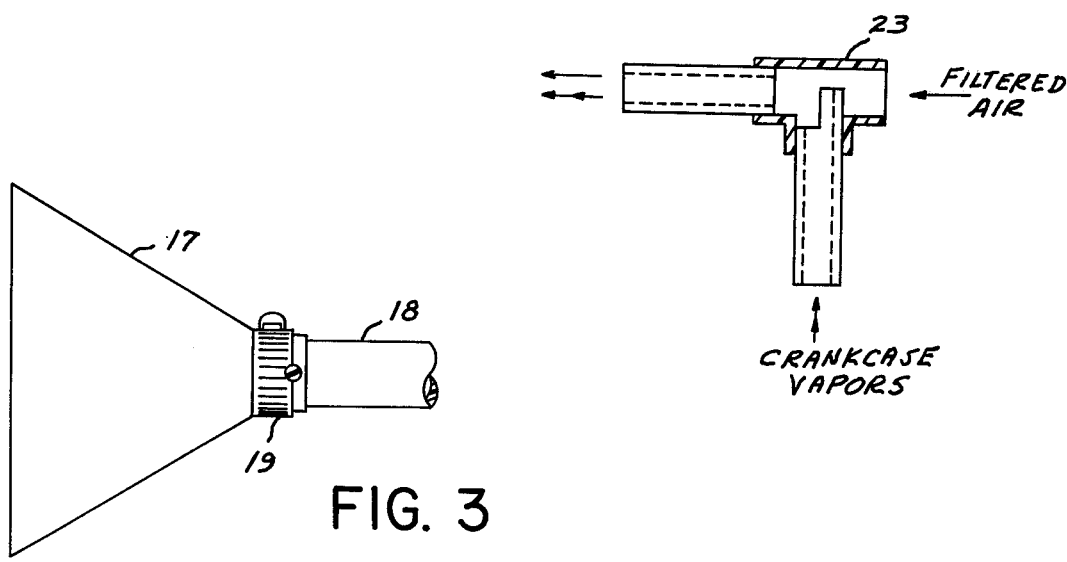
FIG. 5
FIG. 3
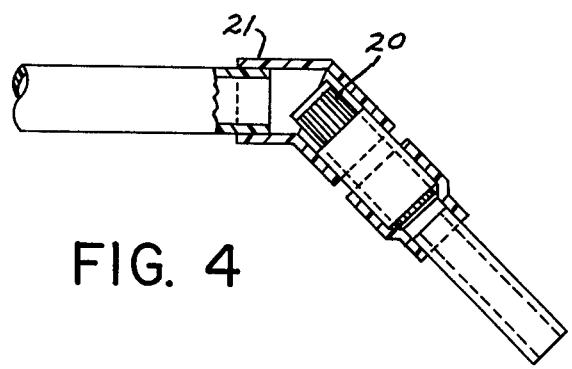
FIG. 4

AUTOMOTIVE FUEL SAVING SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to the utilization of the crankcase vapors in gasoline powered internal combustion engines, particularly those engines used in automotive service.

The directing of crankcase vapors into the air intake system or internal combustion engines is an old, well known art. U.S. Pat. No. 1,286,930 issued in 1918 and U.S. Pat. No. 1,299,790 issued in 1919, disclose early systems of utilizing crankcase vapors. Basically, the crankcase vapors of internal combustion engines consist of two major components, the blowby gases, i.e., the carbureted mixture plus exhaust gases passing by the rings of the piston, and vaporized and entrained particles of the lubricating oils in the crankcase that have been aerified or vaporized due primarily to agitation. The blowby gases contain large amounts of hydrocarbon gases that have a relatively high fuel energy content and can be burned in the engine to provide power that might otherwise be wasted. As reported by P. A. Bennett et al., employees of the Research Laboratories of General Motors Corporation, at the annual meeting of the Society of Automotive Engineers, held in January 1960, in their paper entitled *Reduction of Air Pollution by Control of Emission from Automotive Crankcases*, the blowby is predominately (approximately 85%) carbureted mixture. The aeriated lubricating oil in the crankcase vapor frequently contains relatively large and heavy particulate matter. Generally, without further breaking down of these particles, they are detrimental to passages in the carburetor, and in modern systems they build up and eventually clog the conventional PCV (positive crankcase ventilation) valve. The best known prior art is contained in the following patents: U.S. Pat. No. 1,286,930 to patentee Buckner; U.S. Pat. No. 1,299,790 to Scott; U.S. Pat. No. 1,512,954 to Smith; U.S. Pat. No. 1,525,187 to Indlekofer; U.S. Pat. No. 1,555,664 to Hall et al.; U.S. Pat. No. 1,792,560 to Worbois; U.S. Pat. No. 2,232,784 to Hifner; U.S. Pat. No. 2,250,200 to Lowther; U.S. Pat. No. 2,763,247 to Bailey; U.S. Pat. No. 2,271,150 to Dressler; U.S. Pat. No. 3,358,661 to Garner; U.S. Pat. No. 3,630,182 to Grainger; U.S. Pat. No. 3,677,240 to Sarto; U.S. Pat. No. 3,754,538 to Ephraim, Jr., et al.; U.S. Pat. No. 3,889,649 to Polaner; U.S. Pat. No. 3,973,534 to Amos; and U.S. Pat. No. 4,055,159 to Cappiello.

SUMMARY OF THE INVENTION

The present invention provides a more efficient and substantially maintenance free crankcase ventilation system that results in improved engine efficiency and operation.

BRIEF DESCRIPTION OF THE DRAWING

FIG. 1 is a schematic perspective view of an internal combustion engine fitted with an embodiment of the novel crankcase ventilation system;

FIG. 3 schematically illustrates a typical air scoop;

FIG. 4 schematically illustrates an in-line air filter;

FIG. 5 schematically illustrates an aspirator tee;

DESCRIPTION OF THE PREFERRED EMBODIMENT

Figure 2:
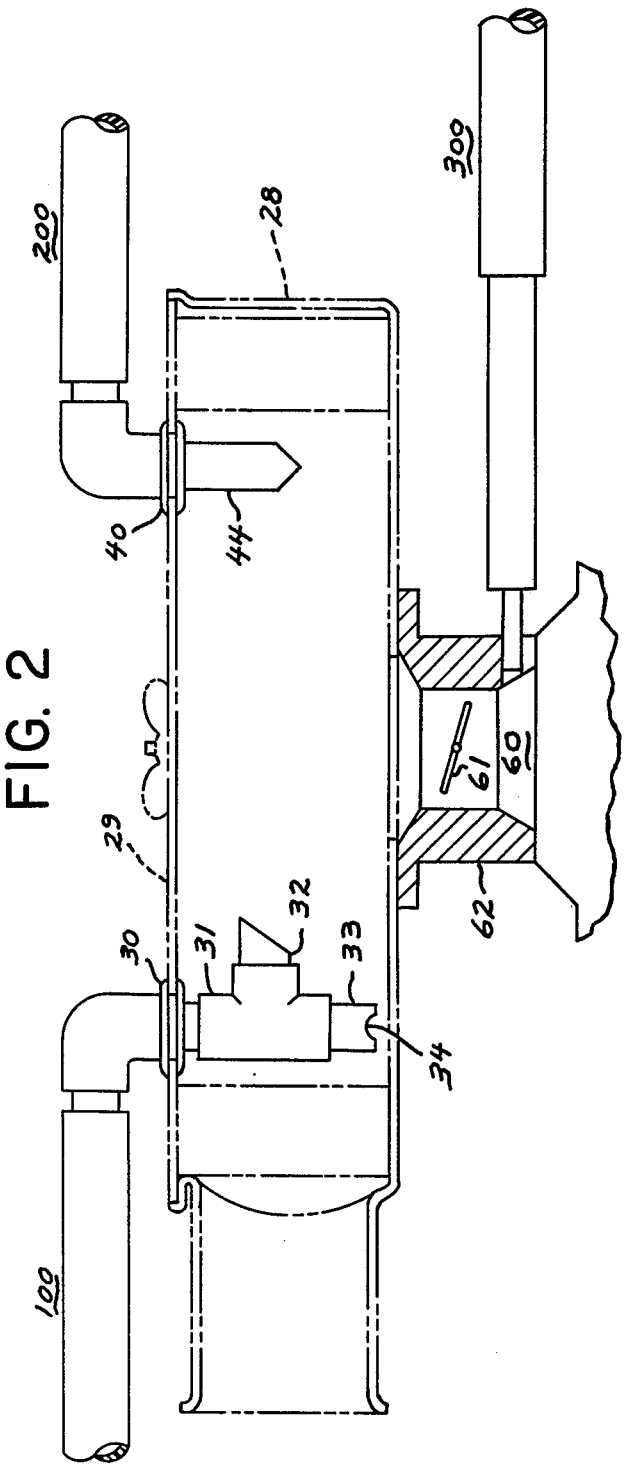
FIG. 2 schematically illustrates the modifications made to the air-fuel inlet system of an internal combustion engine to use the present invention.

FIG. 1 illustrates a typical embodiment of the invention attached to a conventional V-8 type automobile internal combustion engine. It is to be understood that the invention is applicable to all internal combustion engines having a sealed crankcase 11 containing a lubricating fluid with a crankcase ventilation input orifice 12 and a crankcase ventilation output orifice 13, an exhaust manifold 14, and an air and fuel intake system 15. The air and fuel intake system 15 of FIG. 1 is further detailed, schematically, in FIG. 2. FIGS. 1 and 2 should be read together in the following description of a typical embodiment of the invention.

Figure 7:
FIG. 7 schematically illustrates a typical crankcase outlet fitting for Ford and General Motors type cars.
Figure 6:
FIG. 6 schematically illustrates a typical crankcase outlet fitting for Chrysler automotive cars.

The invention primarily comprises three air flow circuits. The first air flow circuit 100, has an air scoop 17, located so as to collect ram air entering the engine compartment boosted by the fan 18. It is generally desirable to locate the scoop behind the fan, i.e., downstream in the air flow, so that an air flow will be present even though the car with the engine running is not in motion. It is not critical, but generally desirable that the fan be rigidly connected to its drive shaft. Fans that are coupled to their shafts through a thermostatic control member, however, generally provide sufficient air flow for the invention even with a cool engine at idle speed. The air scoop 17, shown in further detail in FIG. 3 may be fabricated from any suitable material that will withstand the environment on the engine compartment. A conventional relatively high temperature plastic is suitable. The air scoop is conventionally attached in air-tight relationship to the plastic line 18 by clamping means 19. The air captured by the air scoop 19 must be passed through an air filter to restrain the entry of dust and other particles into the system. FIG. 4 illustrates a suitable conventional pleated paper filter 20, such as a Fram type CG12, positioned in a 45° elbow fitting 21. In some applications, it is desirable to provide an angle fitting, however, obviously, the filter will function just as satisfactorily in a straight fitting and is so illustrated at 22 in FIG. 1. After filtering, the air passes through an aspirator tee 23. A suitable construction for the aspirator tee is shown in detail in FIG. 5. The flow of air over and around the cut-away stem of the tee provides a reduced pressure in the draw tube or stem of the tee to withdraw gases from the crankcase. The stem of aspirator tee 23 is coupled to a fitting as illustrated in FIGS. 6 or 7 which is inserted into the crankcase ventilation outlet opening 13.

The filtered ram air plus the picked up crankcase vapors pass into the conventional tee 24. It is to be noted that the air and vapor flow is substantially horizontal and that the stem of the tee 24 is downward in substantially a vertical direction. As previously mentioned, part of the crankcase vapors consist of relatively large, heavy particulate matter that would be detrimental to the passages in the carburetor. These heavy droplets are drawn down the stem of tee 24 rather than passing straight through with the other gases, thus the tee in this position effectively separates the gases with heavy particulates from the gases containing lighter particulate matter. These large, heavy particulates are heated and further vaporized into smaller, lighter particles or vapors that are not detrimental to the passages in the carburetor by heat from the exhaust manifold 14. The "U" shaped pipe 25 is clamped into tight physical contact with the exhaust manifold 14 by the clamp 26 providing a heat exchanger. After being further vaporized into smaller, lighter particles, the particles and the gas containing them are drawn back into the main air flow by a second aspirator tee 27. This tee is similar in construction to the aspirator tee 23. The primary flow through the tee is in the same relative physical direction with respect to the structure of the tee as in the previously described aspirator tee, i.e., the draw tube portion of the tee connects via a hose to the metallic pipe 25 of the heat exchanger. The now fully vaporized crankcase emissions are fed into the intake air filter, preferably the central portion of the intake air filter. This is further shown in detail in FIG. 2. A hole is cut through the air filter cover 29, a sealing grommet 30 is positioned in the hole, and the air and crankcase vapors are admitted to normal intake air flowing into the carburetor by the tee and stub arrangement 31. The purpose of the tee and stub arrangement 31 is to provide for relatively uniform flow of the crankcase vapors into the carburetor throat and to prevent, through maladjustment at installation, the positioning of the inlet so as to restrict the entry of the gases into the main carburetor air stream. The tee 31 has stub openings 32 and 33. Stub 33 has notches 34 so that even if the stub is pressed against the button of the air filter 28 it will not be completely sealed off. Any condensates that form at this point will fall into stub 33 and accumulate on the floor of the air cleaner.

A second air flow circuit 200 provides filtered air to the crankcase ventilation inlet port 12 with a compensating flow to the carburetor intake air through a grommeted hole 40 in the air filter cover 29. Air scoop 41 is similar to air scoop 17 and similarly located downstream of the fan. The in-line air filter 42 is also similar to the filter 22 of the first air flow circuit. Tee 43 is a conventional tee fitting. The bottom of the stub tube 44, in the carburetor air filter, is preferably cut off on angle as shown so as to preclude the opening being obstructed. The ram air boosted by the fan, captured by the scoop 41 divides between the crankcase and the air inlet to the carburetor air filter such that the air entering the crankcase at port 12 and leaving the crankcase through port 13 ventilates the crankcase yet maintains substantially ambient pressure, (within approximately one inch of mercury, plus or minus), in the crankcase for all operating conditions of the vehicle. It is to be observed that the quantity of air entering the air scoops 17 and 41 is a function of the speed of the vehicle. Thus, the draw on the crankcase vapors created by the air flowing through the aspirator tee 23 increases with an increase in vehicle velocity. Likewise, the air flow through air scoop 41 also increases with vehicle velocity. It has been found that when using a uniform tubing size (except at the couplings and fittings), in order to maintain substantially ambient pressure in the crankcase that an air bleed is necessary in the ram air to the crankcase inlet in order to prevent pressurizing the crankcase. This air bleed may readily be obtained by using a tee in the inlet line to the crankcase with a straight-through air flow in the tee directed to the intake air filter. This structure maintains the air flow into the crankcase at such a magnitude for all vehicle velocities that it balances the draw at the crankcase ventilation outlet orifice, thus maintaining substantially ambient pressure in the crankcase at all times. The excess air bled from the captured air flowing from air scoop 41 and fed into the air intake filter has a slight beneficial supercharging effect on the engine, but not enough to require any readjustment of the engine tuning.

Figure 8:
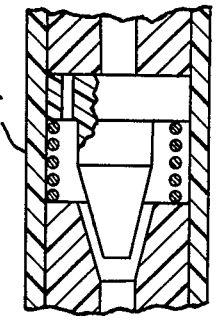
FIG. 8 is a schematic sectional view of a typical variable annular orifice valve used in the air dilution circuit.

The directing of the crankcase vapors, (which as previously mentioned, are approximated 85% carbureted mixture), into the air-fuel intake of a properly tuned engine enriches the mixture to the extent that efficient operation is no longer obtained. In order to compensate for this fuel enrichment, a third air flow circuit 300 is provided. This circuit takes air from the engine compartment through conventional air filter 50, (such as Fram type CG20), meters it through the variable annular orifice 51, which typically is the standard conventional PCV valve for the particular engine involved, and provides the quantity of air to the intake manifold 60 below the carburetor throttle plate 61 to compensate for the previously mentioned enrichment. (The carburetor 62 is shown only in very skeletal form.) A conventional PCV valve 51 is further partially diagrammed in FIG. 8. It should be positioned in the line in the same relative air flow direction through the orifice as it normally is positioned in conventional operation; i.e., minimum air flow through the valve when the intake manifold vacuum is high.

In typical embodiments of the invention, the tee's, elbows, reducers and stubs are conventional one-half and five-eights inch (as appropriate) inside diameter plastic tubing. (PVC ASTM D2846 has been found to be suitable.) The sections of plastic tubing are connected with rubber hose such as conventional heater hose, secured at the ends with conventional hose clamps. The plastic air scoops typically have a bell diameter of approximately five inches and a throat diameter of approximately seven-eights inch. The heat exchanger pipe clamped to the exhaust manifold is typically fabricated from one-half inch (i.d.) copper tubing. Generally, improvements in gasoline mileage of the order of 18 to 20 percent have been achieved with the installation of the invention on conventional automotive passenger type vehicles.

It is to be noted that the subject invention does not in any way alter or modify the tuning of the engine for minimum air polution. The same procedures and adjustments to produce a lean-burn engine may be used with the invention as with conventional crankcase ventilation systems. The release of harmful emissions from the engine are only altered to the extent that since the efficiency of the engine is improved due to better utilization of the crankcase characteristics less fuel is consumed and total emissions per mile are lower.

I claim:

1. In an internal combustion engine having a sealed crankcase with an inlet orifice and an outlet orifice, an exhaust manifold, an air-fuel intake system having an intake air filter communicating with a carburetor having a throttle plate positioned on an intake manifold, the improvement in the utilization of the crankcase vapors comprising:

a. a first air flow circuit having means including an aspirator for withdrawing the said crankcase vapors from the said crankcase, means for separating and heating large, heavy, particulate matter in the said withdrawn vapors providing smaller, lighter particulate matter, means for returning the said smaller, lighter particulate matter to the said first air flow circuit, and successive means for directing the said first air flow containing the said crankcase vapor with smaller, lighter particulate matter into the said engine intake system;

b. a second air flow circuit having means for providing a flow of air divided between the said crankcase inlet orifice and the said intake air filter; and c. means for providing a third air flow circuit metering air into the said air-fuel intake system, whereby compensation is provided for the addition of the crankcase vapors into the said intake system.

2. The improvement as claimed in claim 1 wherein the means for heating the said large, heavy particulate matter comprises a heat exchanger cooperating with the said engine exhaust manifold.

3. The improvement as claimed in claim 2 wherein the said third air flow circuit includes a variable orifice, responsive to the vacuum in the said intake manifold, for metering the said third air flow, and the said means also directs the said metered third air flow into the air-fuel intake system below the said throttle plate.

4. The improvement as claimed in claim 3 wherein the said first air flow circuit and the said second air flow circuit cooperate to provide substantially ambient pressure within the said engine crankcase for substantially all operating conditions of the said engine.

5. In an internal combustion engine having a sealed crankcase with an inlet orifice and an outlet orifice, each communicating therewith, an exhaust manifold, an air-fuel intake system having an intake air filter communicating with a carburetor having a throttle plate, the said carburetor communicating with an intake manifold, and a fan providing an induced flow of cooling air, the improvement in the utilization of the crankcase vapors comprising:

a. a first air flow circuit having,
(1) an air scoop positioned downstream of the said fan capturing a flow of air,
(2) means for filtering the said captured air flow,
(3) a first aspirator tee having an input, an output, and a draw tube,
(4) means for directing the said captured flow of air into the said input of the first aspirator tee,
(5) means for connecting the said draw tube of the said first aspirator tee to the said crankcase outlet orifice,
(6) means cooperating with the said outlet of the first aspirator tee dividing the flow therefrom into a first portion and a second portion,
(7) means for heating the said second portion,
(8) means including a second aspirator tee for combining the said heated second portion with the said first portion, and
(9) means for directing the said combined first portion with the said heated second portion into the said intake air filter;

b. a second air flow circuit having,
(1) an air scoop positioned downstream of the said fan capturing a flow of air,
(2) means for filtering the said captured air,
(3) means for dividing the said flow of captured air into a first flow and a second flow,
(4) means for directing the said first flow into the said crankcase inlet orifice, and
(5) means for directing the said second flow into the said intake air filter; and c. a third air flow circuit having,
(1) an inlet orifice into the said intake manifold below the said carburetor throttle plate, and
(2) a variable orifice cooperating with the said manifold inlet orifice metering a flow of air into the said intake manifold responsive to intake manifold pressure.

6. The improvement as claimed in claim 5 wherein the said third air flow circuit include an air inlet filter cooperating with the said variable orifice provided a filtered air flow into the said variable orifice.

7. The improvement as claimed in claim 6 wherein the means for heating the said second portion of air flow in the said second air flow circuit includes a heat exchanger cooperating with the said exhaust manifold.

8. The improvement as claimed in claim 7 wherein the said means for dividing the said flow of captured air in the said second air flow circuit provides a flow of air, in the said first flow into the crankcase orifice, of such magnitude that the said engine crankcase is at substantially ambient pressure during operation of the said engine.

* * * * *